(12) United States Patent
Dullien et al.

(10) Patent No.: US 8,689,327 B2
(45) Date of Patent: Apr. 1, 2014

(54) METHOD FOR CHARACTERIZATION OF A COMPUTER PROGRAM PART

(75) Inventors: Thomas Dullien, Bochum (DE); Soeren Meyer-Eppler, Muenster (DE)

(73) Assignee: Google Inc., Mountain View, CA (US)

( * ) Notice: Subject to any disclaimer, the term of this patent is extended or adjusted under 35 U.S.C. 154(b) by 819 days.

(21) Appl. No.: 12/881,223

(22) Filed: Sep. 14, 2010

(65) Prior Publication Data

US 2011/0067010 A1     Mar. 17, 2011

(30) Foreign Application Priority Data

Sep. 14, 2009   (DE) .......................... 10 2009 041 098

(51) Int. Cl.
    *G06F 21/00*      (2013.01)

(52) U.S. Cl.
     USPC ................................ 726/22; 726/25; 713/189

(58) Field of Classification Search
     USPC .......................................................... 726/22
     See application file for complete search history.

(56) References Cited

U.S. PATENT DOCUMENTS 5,452,442 A    9/1995   Kephart
7,207,038 B2   4/2007   Bicsak et al.
2001/0005889 A1 *   6/2001   Albrecht ........................ 713/201
2002/0156908 A1   10/2002   Basso et al.
2009/0328220 A1   12/2009   Abdel-Aziz et al.

OTHER PUBLICATIONS

Yin, Zhiyi et al., "Fingerprinting Executable Programs Based on Color Moments of a Novel Abstract Call Graph", The 9th International Conference for Young Computer Scientists, 2008 EEE, pp. 2319-2324.*
Dullien, Thomas, et al.; "Graph-Based Comparison of Executable Objects"; Actes du Symposium SSTIC05, 2005, p. 1-13.
Thompson, Gerald R., et al.; "Polymorphic Malware Detection and Identification via Context-Free Grammar Homomorphism", Bell Labs Technical Journal 12(3), 2007, p. 139-147.
Blichmann, C.; "Automatisierte Signaturgenerierung fuer Malware-Staemme"; Thesis: Chair of Information Science VI, Dortmund Technical University, Jun. 3, 2008, p. 1.
Yin, Zhiyi et al., "Fingerprinting Executable Programs Based on Color Moments of a Novel Abstract Call Graph", The 9th International Conference for Young Computer Scientists, 2008 IEEE, pp. 2319-2324.

* cited by examiner

*Primary Examiner* — Yogesh Paliwal
(74) *Attorney, Agent, or Firm* — Fox Rothschild LLP

(57) ABSTRACT

A method for characterizing a computer program section held in a computer memory system may include dividing the computer program section into segments, where program commands contained in the computer program section may be used to define a program flow relationship between the segments, and determining characteristic data which may be associated with the program flow relationship of the segments. The characteristic data may be compressed to form a signature which identifies the computer program section.

16 Claims, 2 Drawing Sheets

```
main() {
    printf ("Hello.");
    if (g-variable) {
        printf ("Hello2.");
    }
    else {
        printf ("Hello3.");
    }
    printf ("Goodbye.");
}
```

Fig. 1

METHOD FOR CHARACTERIZATION OF A COMPUTER PROGRAM PART

BACKGROUND

A computer program is understood to mean a plurality of program instructions which are to be executed in a computer system by one or more microprocessors in a particular order. So that the program instructions can be executed by the microprocessor(s), they are in a binary format which the microprocessor can understand directly and which is specific to the executing microprocessor. The work instructions in this format which is specific to the microprocessor are usually able to be understood by a human observer, for example a programmer, only with very great difficulty or not at all. In order for the writing of a computer program to be simplified or made possible in the first place, programming languages called high-level languages are usually used today. High-level languages of this kind involve program instructions which are to be executed by the microprocessor being formulated by the programmer in a language which is able to be understood by humans and being stored in what is known as a source text. So that the program instructions contained in the source text can be executed by the microprocessor, transformation into the specific format which the microprocessor can execute is necessary. There are basically two possibilities in this regard: firstly, the entire source text can be translated completely into the format specific to the microprocessor prior to execution by the microprocessor; secondly, it is possible for each program instruction in the source text to be first of all interpreted by a further computer program, what is known as the interpreter, and converted into the program instructions which are necessary for execution of the work instruction and which are specific to the microprocessor. Similarly, hybrid forms are known, as are implemented in the programming language Java, for example: in this case, the source text is first of all translated completely into a bytecode which is not yet specific to the microprocessor, and the bytecode is subsequently interpreted in order to produce program instructions which are specific to the microprocessor. For reasons of efficiency, a source code is nowadays predominantly translated completely before the first execution of the program instructions by a microprocessor. This involves the use of what is known as a compiler.

The program instructions to be processed in a particular order by a microprocessor are usually not in this specific order in a computer memory system. On the contrary, one or more program instructions to be executed in direct succession have been respectively combined to form groups, said groups being connected to one another by program flow instructions, which are in the form of jump instructions or function calls, for example. This structure of a computer program is regularly also reflected in the associated source text written in a high-level language, said source text likewise being divided into functions or subprograms and having blocks of program instructions which are connected to one another by branches or jump instructions. However, there is generally no explicit association between blocks of program instructions in the source text and groups of program instructions in the microprocessor-specific format.

The translation of a source text which is in a high-level language into microprocessor-specific program instructions by means of a compiler does not result in an explicitly determined computer program, i.e. in a necessarily explicitly defined sequence of microprocessor-specific program instructions which are in binary format. This is the case firstly when the high-level-language source text is translated for execution on different microprocessors which have no command compatibility with one another. However, even if the translation is produced for an identical type of microprocessor, different translations of an identical high-level-language source text can result in computer programs which are different in binary format. One reason for this can be regarded as optimizations which the compiler performs in order to attain a computer program which can be executed as efficiently as possible. Thus, a change in the execution order of program instructions, the inversion of jump conditions and the combination of program instructions which are actually connected to one another by a jump command to produce a related group are common optimization processes for compilers. Depending on the choice of the degree of optimization by the compiler and other ambient conditions, very different computer programs therefore arise from an identical high-level-language source code as a result of translation by means of the compiler. A problem in this case is that the presence of two computer programs which differ in terms of their specific sequence of microprocessor instructions without the presence of the source text means that it is not possible to establish whether these have actually been produced by translating the identical source text. This applies even more so for translations of an identical source text using different compilers or for different target microprocessors.

It is admittedly possible to convert computer programs into an assembler source text which humans can read but which is at machine level by means of reverse translation (disassembly). However, a problem in this case is that firstly the preceding translation of the high-level-language source text into the microprocessor-specific computer program loses important information carriers, such as function or variable names; secondly, the assembler source texts obtained through disassembly reproduce the optimizations performed by the compiler, so that even comparison of two assembler source texts obtained through reverse translation does not allow inference of the identity of the original high-level-language source text. This relatively simple alterability of the microprocessor-specific presentation of a computer program without changing or essentially changing the actual high-level-language source text is utilized particularly by malware, for example computer viruses, computer hacking tools and so on in order to make it difficult to recognize malware in running computer systems. Since the high-level-language source text of a piece of malware is usually unknown, it is possible to identify destructive programs in the course of computer operation only by comparing the computer program which is present in the computer memory system in its microprocessor-specific form with already known microprocessor-specific forms of destructive programs. Simple retranslation of the high-level-language source text of the destructive program provides the opportunity to obtain a computer program whose binary presentation has been altered such that the computer program can no longer be recognized as harmful by current antivirus software.

A reliable method for recognizing matches or differences between two or more computer programs which are not known in the source text is also desirable outside of the recognition of malware, for example in order to recognize inadmissible changes in a computer program, to make it possible to establish differences between various versions of a computer program or to detect inadmissible use of protected source texts.

The document by Thomas Dullien, Rolf Rolles, "Graph-based comparison of Executable Objects", which appeared in the conference volume of the Symposium sur la Securite des Technologies de l'Information et des Communications 2005, Rennes, France, Jun. 2, 2005, describes a method for comparing two computer programs held in a computer memory system. The aim is to determine the degree of match or discrepancy between the two computer programs, which are not in a high-level-language source text. The method works as follows: first of all, the two computer programs which are in a microprocessor-specific format are reverse translated in order to obtain a respective assembler source text. Next, the computer program is broken down into computer program sections, each of the computer program sections comprising precisely one function or precisely one subprogram of the computer program. The computer program sections obtained are connected to one another by program flow instructions in the form of function calls or subprogram calls, so that a program flow relationship is defined between the computer program sections. The program flow relationship can be presented in the form of a first directed graph, known from mathematical graph theory, wherein the computer program sections define nodes and the program flow instructions connecting the computer program sections to one another define edges of the first directed graph. In this case, an edge connects a respective first computer program section (source node) to a second computer program section (destination node), the direction of the edge being prescribed by a program flow instruction which points from the source node to the destination node. The totality of the nodes and edges maps an abstract program flowchart for the computer program. The subdivision of the computer program into computer program sections is followed by breakdown of each of the computer program sections into segments, wherein each of the segments is defined by directly successive instructions and wherein a program flow relationship between the segments is defined by jump instructions, for example conditional instructions or loop instructions. The program flow relationship of the segments can be presented for each of the computer program sections in the form of a second directed graph, wherein the segments define nodes and the program flow instructions connecting the segments to one another define edges on the second directed graph. The totality of the nodes and edges on the second directed graph maps an abstract program flowchart for the respective computer program section. Each node on the first directed graph can be represented by the second directed graph which corresponds to the associated computer program section in order to obtain a complete, abstract program flowchart for the computer program. The comparison between the two computer programs held in the computer memory system is now made by comparing the respective ascertained complete abstract program flowcharts, that is to say by comparing the complete first directed graphs, which each contain all the second directed graphs. An advantage in this context is that, for example, optimizations in the compiler mean that differences in the microprocessor-specific binary presentation of the computer programs which are caused during the translation of the high-level-language source text do not result in discrepancies, or result in only a few discrepancies, in the abstracted program flowcharts, so that functionally matching and functionally different or altered areas of the computer programs can be identified with a high level of reliability. However, a drawback is that the complete comparison of the abstract program flowcharts is very complex and cannot be performed with complete automation. For the purpose of automation, therefore, a simplified comparison is performed which involves the number of respectively ascertained nodes and edges being compared in order to establish a match or discrepancy in the computer programs. However, this method has the drawback of high susceptibility to error, since a match in the programs which is actually not present is established if by chance the graphs which do not match one another have the same number of nodes or edges.

U.S. Pat. No. 7,207,038 B2 describes a method for producing flowcharts for an executable computer program. The method comprises subdivision of the computer program held in a computer memory system into computer program sections which are connected to one another by function calls or jump instructions, and the creation of a flowchart structure on the basis of the identified computer program sections. The aim is to optimize a computer program which is not known in the high-level-language source text in terms of the efficiency of its flow by altering the order of function calls.

The document G. R. Thomson et al., "Polymorphic Malware Detection and Identification via Context-Free Grammar Homomorphism", Bell Labs Technical Journal 12(3), 2007, pp. 139-147 describes a method for malware detection, in which a computer program being suspected to be malware is broken down into sections being defined by functions of the computer program code. A control flow graph is constructed for each respective section, and the sections are sorted and numbered as per the length of the longest simple path through the respective control flow graph. Afterwards, a grammatical rule, describing mutual function calls of the sections, is constructed from the control flow graphs. In order to characterize the computer program, the constructed grammar rules are serialized into a single string. A drawback of the described method is that only a single serialized string of undefined length is constructed for identification of the computer program, rendering comparison of two different computer programs by comparing the resulting serialized strings impossible. Furthermore, even small modifications of a program code may lead to serious changes in the constructed serialized string.

SUMMARY OF THE INVENTION

It is an object of the invention to specify a method for characterizing a computer program section which is held in a computer memory system which allows reliable and efficient denotation and identification of the computer program section.

The invention achieves this object by a method for characterizing a computer program section held in a computer memory system, comprising the steps of breaking down the computer program section into segments, wherein program commands contained in the computer program section are used to define a program flow relationship between the segments, and determining characteristic data which can be associated with the program flow relationship of the segments, wherein the characteristic data are compressed to form a signature which identifies the computer program section.

The compression of the characteristic data which can be associated with the program flow relationship of the segments to form a signature which identifies the computer program section explicitly characterizes the computer program section. Expediently, the characteristic data are compressed to form the signature in this case such that the most explicit possible association of the signature with the program flow relationship of the segments is ensured. Preferably, the characteristic data can be mapped onto the signatures easily and efficiently, whereas inverse association of the signature with the characterized program flow relationship without knowledge of the program flow relationship does not need to be able to be performed efficiently. The knowledge of just the signature thus advantageously permits no direct conclusion on the program flow relationship. Matching signatures indicate with a high level of probability that computer program sections with an identical abstracted program flowchart are involved and hence with a high level of probability that translations of an identical or at least functionally identical source text are involved. Advantageously, the compression of the characteristic data is chosen such that the associated signature in the case of sufficiently large program sections which are typical of real computer programs is practically explicit. The signature can advantageously be stored with little storage complexity and is easily accessible to comparison operations, so that it is advantageously possible to check computer program sections which have not been characterized to date efficiently for a match or discrepancy with already known computer program sections by comparing the signatures produced. Particularly advantageously, characteristic data are compressed to form a signature by capturing a plurality of characteristic data items, the plurality of characteristic data items being regarded as a vector in a vector space and being transformed into a real number by means of mathematical convolution of the vector.

The characteristic data which can be associated with the program flow relationship are preferably determined by presenting the program flow relationship in a directed graph, wherein the segments define the nodes on the graph and the program flow instructions defining the program flow relationship define the edges on the graph. The characteristic data can then easily be determined by means of properties of the graph. Preferably, characteristic data are produced by properties of at least one edge and of the source nodes and destination nodes connected to the respective at least one edge; with particular preference, the characteristic data comprise properties of all or at least a plurality of the edges. Expediently, the characteristic data captured are the topological order of the source node of an edge (defined by the maximum number of directed edges which lead to the source node on a direct path from a starting node which does not have any approaching edges), the number of edges leading to the source node (i.e. the degree of input for the source node), the number of edges leading away from the source node (i.e. the degree of output for the source node), the degree of input for the destination node, the degree of output for the destination node and/or the number of subfunction calls within a node.

Expediently, the computer program section comprises at least one function or a subprogram of a computer program which is at least partially stored in the computer memory system. In this case, the method can be applied directly to a computer program section which is in a format which a microprocessor can execute directly. Preferably, however, the method is applied to an assembler source text—possibly obtained by means of reverse translation—for the computer program section. It has to be understood that the method can also be applied to a computer program section which is in a high-level language, to a computer program section which is to be interpreted or to a bytecode, for example the bytecode of a Java program.

The computer program section is preferably dissected such that each of the segments comprises a linear sequence of program instructions which are not connected to one another by jump instructions or the like. Subprogram calls contained in the segments can respectively be resolved or remain unresolved.

Expediently, the method is performed by a computer program on a computer system with a microprocessor. An advantage of the method in this case is that the computer program section to be characterized may also be in a format which is incompatible with the microprocessor, so that the program instructions contained in the computer program section cannot themselves be executed via the microprocessor which performs the method. Nevertheless, it is possible for the computer program section to be executed on the computer system which performs the method; in particular, the computer program section can also be characterized in the course of operation of the computer program which comprises the computer program section.

Preferably, the breakdown comprises identification of program flow instructions from the computer program section. Such program flow instructions may, in particular, be in the form of unconditional jump commands, conditional jump commands, loops or subfunction calls. Segments are then expediently defined by identifying areas which comprise no program flow instructions.

The method according to the invention advantageously allows identification of malware in the course of operation of a computer system. To this end, known malware computer programs are characterized using the method according to the invention and by storing the signatures ascertained by the method. Application of the method according to the invention to computer program sections running in the computer system and comparison of the signature produced with the stored signatures for known malware computer programs allow identification of malware, even if the specific implementation of the computer program section in the computer memory system was not previously known to be destructive.

A method according to the invention for identifying at least one computer program held in a computer memory system comprises the steps of subdividing the computer program into computer program sections and applying the method according to the invention for characterizing a computer program section held in a computer memory system to at least one of the computer program sections in order to ascertain a signature which identifies the computer program section. Preferably, the method is applied to a plurality of, particularly preferably to all, computer program sections, so that a set of signatures which identifies the computer program overall is produced. Alterations in the computer program can be recognized particularly reliably by this method, since an alteration in the computer program regularly results only in a change in a few signatures from the set of signatures.

Expediently, the computer program sections are formed by functions or subprograms of the computer program. Advantageously, it is thus possible for relationships between computer programs, which are defined by the use of matching or same-action functions or subprograms, to be ascertained by comparison of the signatures.

Expediently, the subdivision of the computer program into computer program sections comprises reverse translation from a format which a microprocessor can execute directly into an assembler language.

The method can advantageously be used to identify computer programs which are part of a computer program family. In this case, a computer program family is defined by virtue of a plurality of computer programs having a significant proportion of common functions, as is the case with advancements in computer programs or relatively small modifications in the computer program. This particularly allows simplification of the analysis of malware, since recognition of modifications in already known destructive programs allows previously obtained analysis results to be resorted to. Similarly, identification of functions changed by a patch within a computer program family is made possible.

An advantageous method for comparing a machine-executable first computer program and a machine-executable second computer program in order to ascertain a degree of match comprises the steps of applying the method for denoting a computer program section or a computer program to the first computer program or a computer program section of the first computer program in order to produce a first set of signatures which identify the first computer program, applying the method for denoting a computer program section or a computer program to the second computer program or a computer program section of the second computer program in order to produce a second set of signatures which identify the second computer program, and determining the degree of match by forming a difference between the first set and the second set of signatures. This allows simple and reliable identification of those functions of the first computer program and of the second computer program which have different abstract program flowcharts. Accordingly, the computer program sections which have a signature which is not contained in the intersection of the first set and the second set of signatures are preferably identified.

Advantageously, use of the method for comparing a machine-executable first computer program and a machine-executable second computer program allows ascertainment of an alteration in a computer program whose source text is unknown by virtue of the method being applied to the unchanged and changed versions of the computer program.

An advantageous method for ascertaining alterations or matches in a machine-executable computer program or computer program section which is held in a computer memory system of a local computer in comparison with at least one reference computer program comprises the steps of applying the method according to the invention for denoting a computer program section or a computer program to the computer program or the computer program section in order to ascertain at least one signature, transferring the at least one signature to a remote computer system, and comparing the transferred signatures with a set of signatures stored on the remote computer system in order to ascertain an alteration or match. Advantageously, this method allows ascertainment of the authenticity of software, that is to say a complete match between the computer program held in the computer memory system of the local computer and a reference computer program. In addition, the method allows efficient and safe checking of computer programs executed on a local computer for destructive or undesirable program sections, even if the specific binary form thereof was previously unknown. The storage of signatures on a computer system which can be reached via network connections such as the Internet, for example, also allows the setup of a search service for recognizing and associating computer programs and computer program sections, similar to the known Internet search services for text or multimedia files. A particular advantage in this case is the use of the at least one signature to identify the computer program in a manner which is independent of the specific machine-executable form of a computer program.

Further advantages and features of the invention can be found in the subsequent description of preferred exemplary embodiments and the dependent claims.

The invention is explained below using a preferred exemplary embodiment with reference to the appended figures.

BRIEF DESCRIPTION OF THE DRAWINGS

FIG. 1 shows the source text for a computer program section written in the high-level language C.

DETAILED DESCRIPTION

Figure 2:
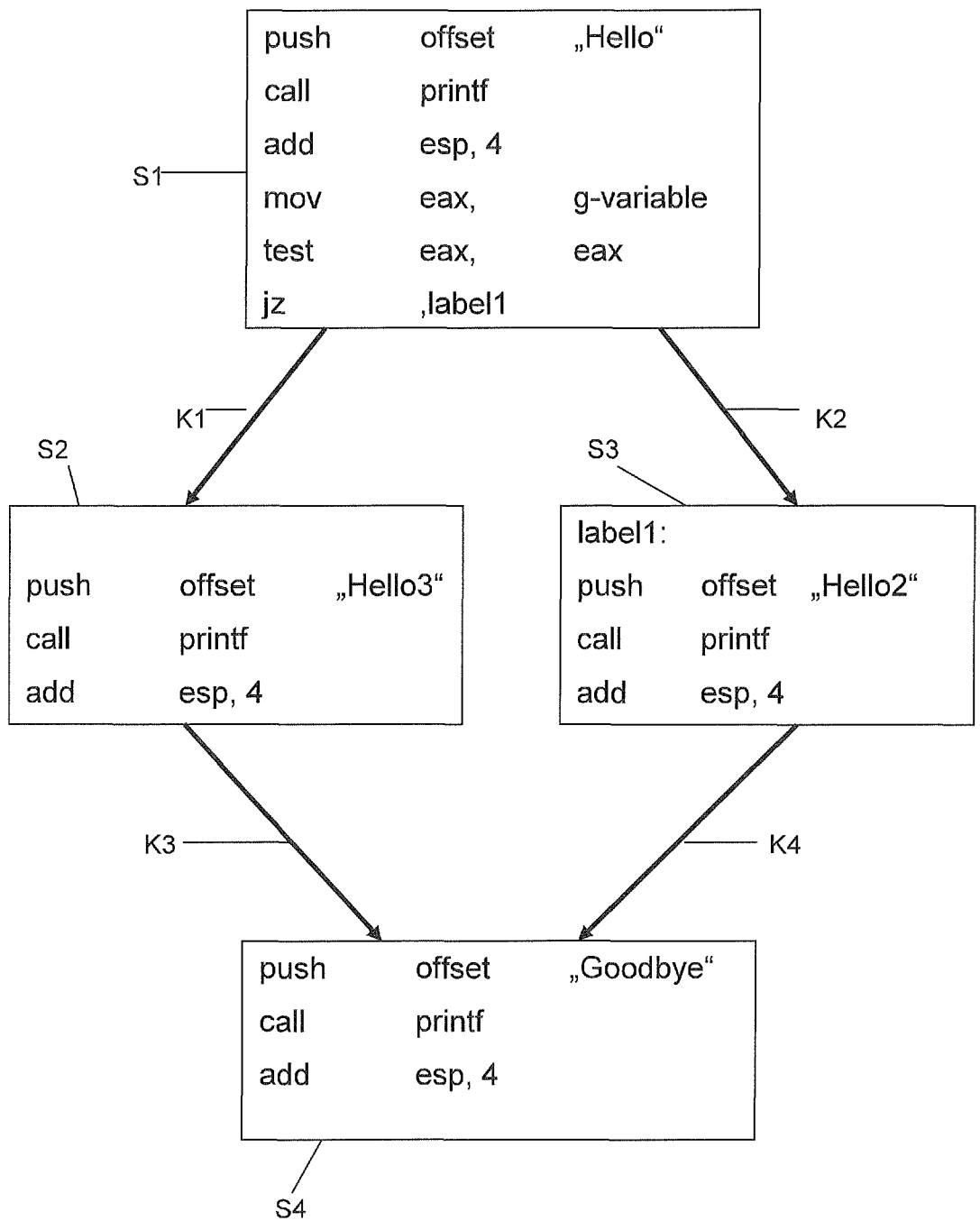
FIG. 2 shows the source text from FIG. 1 in an assembler language, wherein segments of the assembler source text have been distinguished.

The computer program section shown in FIG. 1 is written in the programming language C and comprises a single function, the main function main( ) of a computer program. The instructions contained in the source text prompt the following: first of all, a call to the subfunction printf outputs the text "Hello" on the screen. This is followed by a program flow instruction, which in the present case is in the form of a conditional branch of the type of an if-else instruction. The instruction if (g-variable) tests whether the variable g-variable assumes the value "TRUE" or "FALSE". If the variable g-variable has the value "TRUE" "Hello2" is output, otherwise "Hello3" is output on the screen by means of the subfunction printf. Finally, a call to the subfunction printf outputs "Goodbye" on the screen.

FIG. 2 shows an assembler source text associated with the source text from FIG. 1. In the present case, the assembler source text has been produced as follows: first of all, the source text shown in FIG. 1 has been translated by means of a compiler on a computer system into a computer program which the microprocessor of the computer system is able to execute directly. In this case, the computer program comprises a computer program section which is defined by the main function and which corresponds to an implementation of the source text shown in FIG. 1. Reverse translation (disassembly) of the computer program has produced the computer program's assembler source text reproduced in FIG. 2. The assembler source text is divided into segments S1, S2, S3, S4 in the illustration shown in FIG. 2. As can be seen, the source text has a first segment S1 which comprises instructions for calling the subprogram printf and for outputting the character string "Hello" on the screen. The segment S1 also comprises instructions for checking the value of the variable g-variable, and the jump instruction jz. On the basis of the value of the variable g-variable, the program is continued in the segment S2, which contains instructions for outputting the character string "Hello3" on the screen, or the segment S3, for outputting the character string "Hello2". The program is continued by jumping from the end of the segment S2 or S3 to the start of the segment S4 and outputting "Goodbye" on the screen.

In the illustration shown in FIG. 2, the segments S1, S2, S3, S4 define nodes on a directed graph. Jump instructions, which respectively connect pairs of the segments S1, S2, S3, S4 to one another, are shown by arrows. The arrows correspond to the program flow instructions of the computer program and form edges K1, K2, K3, K4 on the graph. The graph shown in FIG. 2 therefore has four nodes and four edges.

The method for denoting the computer program section now works automatically by virtue of an evaluation program running on the microprocessor of the computer system, as follows:

First of all, characteristic data are associated with the program flow relationship between the segments S1, S2, S3, S4. In the present case, an association with the edges K1, K2, K3, K4 of the graph is made as follows:

1. Determine the topological order T for the source node of the edge.

2. Determine the degree of input EQ for the source node.

3. Determine the degree of output AQ for the source node.

4. Determine the degree of input EZ for the destination node.

5. Determine the degree of output AZ for the destination node.

For the edges K1, K2, K3, K4 shown in FIG. 2, the values shown in the table below are obtained:

|    | K1 | K2 | K3 | K4 |
|----|----|----|----|----|
| T  | 0  | 0  | 1  | 1  |
| EQ | 0  | 0  | 1  | 1  |
| AQ | 2  | 2  | 1  | 1  |
| EZ | 1  | 1  | 2  | 2  |
| AZ | 1  | 1  | 0  | 0  |

Compression of the characteristic data to form a signature now works as follows:

Each edge K1, K2, K3, K4 is first of all assigned a vector for the ascertained characteristic data (T, EQ, AQ, EZ, AZ). Next, each edge is assigned an explicitly determined number by calculating the first function Z=T+EQ*sqrt(2)+AQ*sqrt(3)+EZ*sqrt(5)+AZ*sqrt(7), where sqrt( ) denotes the mathematical square root function. The following association is obtained:

| K1 | K2 | K3 | K4 |
|----|----|----|----|
| 8.3459209 | 8.3459209 | 8.61840032 | 8.61840032 |

The signature obtained for the computer program section is therefore the set of numbers {Z1=8.3459209; Z2=8.3459209; Z3=8.61840032; Z4=8.61840032}. Further compression of this set of numbers is effected by producing a compressed coefficient V using a second function, comprising the addition of the reciprocals of the numbers associated with the edges K1, K2, K3, K4: V=1/Z1+1/Z2+1/Z3+1/Z4. In the aforementioned example, a compressed coefficient V=0.471699652 is therefore obtained. Summation of the reciprocals 1/Z in the second function advantageously avoids interaction, particularly reciprocal cancellation, of individual terms of the first function.

It has been found to be a particularly effective method for comparing computer programs to examine the computer programs for whether there are respective pairs of computer program sections with the same compressed coefficients which call one another. Whereas the detection of computer program sections with an identical compressed coefficient, particularly in the case of computer programs with a small scope, may possibly still arise from a random match, a random match between such pairs of computer program sections when applied to real computer programs is ruled out with almost complete certainty. A particularly advantageous method for denoting a computer program is therefore obtained in that, following the subdivision of the computer program into computer program sections, an edge connecting a first computer program section to a second computer program section is respectively assigned the compressed signature of the first computer program section and of the second computer program section as an edge signature. If a large number of identical edge signatures arises in two computer programs, this results in a corresponding measure of similarity or match for the computer programs.

The method according to the invention has been explained above with reference to a computer program with just one function, the main function main( ). It has to be understood that the method can also be applied to a computer program with a multiplicity of functions and subprograms, with each function or each subprogram expediently being characterized as a computer program section. Application of the method according to the invention to computer programs of customary scope results in a signature which explicitly identifies the computer program and which comprises a set of numbers with up to 10 000 or more elements. It has to be understood that compressed signatures can be produced from signatures in all cases using the aforementioned second function. It also has to be understood that in all cases it is possible to produce edge signatures for immediate or later comparison with other, possibly still unknown computer programs.

What is claimed is:

1. A method of characterizing a computer program section held in a computer memory system, the method comprising:
   dividing a computer program section into a plurality of segments wherein each segment comprises one or more program commands;
   defining a directed graph comprising one or more nodes and one or more edges, wherein each node represents one of the segments and each edge represents one or more program flow instructions;
   determining characteristic data associated with each edge, wherein the characteristic data comprises:
   a topological order for a source node of the edge,
   a degree of input for the source node,
   a degree of output for the source node,
   a degree of input for a destination node of the edge,
   a degree of output for the destination node; and
   determining a signature for the computer program section based on the characteristic data.

2. The method as claimed in claim 1, wherein determining characteristic data comprises determining data from segments which are connected to one another by a program flow instruction.

3. The method as claimed in claim 1, wherein the computer program section is stored in the computer memory system in a form which can be processed directly by a processing unit of a computer.

4. The method as claimed in claim 1, wherein dividing a computer program section into a plurality of segments comprises selecting a plurality of segments, and wherein only characteristic data from the selected segments are used to determine the signature.

5. The method as claimed in claim 1, wherein the computer program section is part of a computer program which is stored executably in the computer memory system or which is executed by a microprocessor.

6. The method of claim 5, further comprising using the signature to identify malware in the course of operation of a computer system.

7. The method of claim 1, wherein determining a signature comprises determining, for each edge:

$$T+EQ\sqrt{2}+AQ\sqrt{3}+EZ\sqrt{5}+AZ\sqrt{7}$$

where:
   T is the topological order,
   EQ is the degree of input for the source node,
   AQ is the degree of output for the source node,
   EZ is the degree of input for a destination node,
   AZ is the degree of output for the destination node.

8. The method of claim 1, wherein determining a signature comprises compressing the characteristic data.

9. The method of claim 1, further comprising comparing the signature with one or more signatures stored on a remote computer system in order to ascertain an alteration or match to the signature.

10. A system for characterizing a computer program section, the system comprising:
   a computing device; and
   a computer-readable storage medium in communication with the computing device, wherein the computer-readable storage medium comprises one or more programming instructions that, when executed, causes the computing device to:
divide a computer program section into a plurality of segments wherein each segment comprises one or more program commands,
define a directed graph comprising one or more nodes and one or more edges, wherein each node represents one of the segments and each edge represents one or more program flow instructions,
determine characteristic data associated with each edge, wherein the characteristic data comprises:
a topological order for a source node of the edge,
a degree of input for the source node,
a degree of output for the source node,
a degree of input for a destination node of the edge, and
a degree of output for the destination node, and
determine a signature for the computer program section based on the characteristic data.

11. The system of claim 10, wherein the one or more programming instructions that, when executed, cause the computing device to divide a computer program section into a plurality of segments comprise one or more programming instructions that, when executed, cause the computing device to select a plurality of segments, wherein only characteristic data from the selected segments is used to determine the signature.

12. The system of claim 10, wherein the computer-readable storage medium further comprises one or more programming instructions that, when executed, cause the computing device to use the signature to identify malware.

13. The system of claim 10, wherein the one or more programming instructions that, when executed, cause the computing device to determine a signature comprise one or more programming instructions that, when executed, cause the computing device to determine, for each edge:

$$T+EQ\sqrt{2}+AQ\sqrt{3}+EZ\sqrt{5}+AZ\sqrt{7}$$

where:
T is the topological order,
EQ is the degree of input for the source node,
AQ is the degree of output for the source node,
EZ is the degree of input for a destination node,
AZ is the degree of output for the destination node.

14. The system of claim 10, wherein the one or more programming instructions that, when executed, cause the computing device to determine a signature comprise one or more programming instructions that, when executed, cause the computing device to compress the characteristic data.

15. A method of determining a degree of match between two computer programs, the method comprising:
dividing a first computer program section into a plurality of first segments wherein each first segment comprises one or more program commands;
defining a first directed graph comprising one or more first nodes and one or more first edges, wherein each first node represents one of the first segments and each first edge represents one or more first program flow instructions;
determining first characteristic data associated with each first edge, wherein the first characteristic data comprises:
a first topological order for a source node of the first edge,
a first degree of input for the source node,
a first degree of output for the source node,
a first degree of input for a destination node of the first edge,
a first degree of output for the destination node;
determining a first signature for the computer program section based on the first characteristic data;
dividing a first computer program section into a plurality of first segments wherein each first segment comprises one or more program commands,
defining a second directed graph comprising one or more second nodes and one or more second edges, wherein each second node represents one of the second segments and each second edge represents one or more second program flow instructions;
determining second characteristic data associated with each second edge, wherein the second characteristic data comprises:
a second topological order for a source node of the second edge,
a second degree of input for the source node,
a second degree of output for the source node,
a second degree of input for a destination node of the second edge,
a second degree of output for the destination node;
determining a second signature for the computer program section based on the second characteristic data; and
determining a degree of match between the first computer program and the second computer program by determining a difference between the first signature and the second signature.

16. The method of claim 15, further comprising identifying one or more computer program sections which have a signature outside of an intersection of the first signature and the second signature.

* * * * *